(12) United States Patent
Yao et al.

(10) Patent No.: US 10,656,475 B2
(45) Date of Patent: May 19, 2020

(54) PIXEL ELECTRODE STRUCTURE AND LIQUID CRYSTAL DISPLAY PANEL

(71) Applicant: Shenzhen China Star Optoelectronics Technology Co., Ltd., Shenzhen (CN)

(72) Inventors: Xiaohui Yao, Shenzhen (CN); Je Hao Hsu, Shenzhen (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 43 days.

(21) Appl. No.: 14/897,831

(22) PCT Filed: Oct. 23, 2015

(86) PCT No.: PCT/CN2015/092749
§ 371 (c)(1),
(2) Date: Feb. 14, 2018

(87) PCT Pub. No.: WO2017/063222
PCT Pub. Date: Apr. 20, 2017

(65) Prior Publication Data
US 2018/0217451 A1    Aug. 2, 2018

(30) Foreign Application Priority Data
Oct. 15, 2015    (CN) .......................... 2015 1 0664790

(51) Int. Cl.
*G02F 1/1343* (2006.01)
*G02F 1/1337* (2006.01)

(52) U.S. Cl.
CPC .. *G02F 1/134309* (2013.01); *G02F 1/133707* (2013.01); *G02F 1/133753* (2013.01);
(Continued)

(58) Field of Classification Search
None
See application file for complete search history.

(56) References Cited

U.S. PATENT DOCUMENTS 8,279,385 B2 * 10/2012 Kim ................. G02F 1/134309
349/129
2003/0160750 A1    8/2003 Ueda et al.
(Continued)

FOREIGN PATENT DOCUMENTS

| CN | 1763613 A | 4/2006 |
|----|-----------|--------|
| CN | 100349037 | 11/2007 |

(Continued)

OTHER PUBLICATIONS

Notification of Transmittal of the International Search Report and the Written Opinion of the International Searching Authority (Forms PCT/ISA/210, PCT/ISA/237, and PCT/ISA/220) dated Jul. 21, 2016, by the State Intellectual Property Office of People's Republic of China in corresponding International Application No. PCT/CN2015/092749. (13 pages).
(Continued)

*Primary Examiner* — Richard H Kim (57) ABSTRACT

A pixel electrode structure and a liquid crystal display panel are disclosed. The pixel electrode structure comprises a first trunk electrode and a second trunk electrode, the first trunk electrode and the second trunk electrode intersecting with each other to form a plurality of liquid crystal alignment regions, and a plurality of branch electrodes, one end of each branch electrode being connected with at least one of the first trunk electrode and the second trunk electrode, the branch electrodes distributed in one liquid crystal alignment region being parallel to one another, wherein in each of the liquid crystal alignment regions, a distance between two adjacent branch electrodes gradually decreases along a direction from a center of a liquid crystal alignment region
(Continued)

to a corner thereof. With the pixel electrode structure, a display performance of a liquid crystal display panel under wide viewing angle can be improved, and an aperture ratio thereof can be maintained.

18 Claims, 4 Drawing Sheets

(52) U.S. Cl.
CPC ........... *G02F 2001/133742* (2013.01); *G02F 2001/133757* (2013.01); *G02F 2201/122* (2013.01); *G02F 2201/123* (2013.01)

(56) References Cited

U.S. PATENT DOCUMENTS

| | | | |
|---|---|---|---|
| 2004/0060209 A1 | 4/2004 | Watanabe | |
| 2011/0063557 A1 | 3/2011 | Kim et al. | |

FOREIGN PATENT DOCUMENTS

| | | |
|---|---|---|
| CN | 102023420 | 4/2011 |
| CN | 102955300 | 3/2013 |
| CN | 104267553 A | 1/2015 |
| JP | 2001-109018 | 4/2001 |
| JP | 2002-287108 A | 10/2002 |
| JP | 2002-301942 A | 10/2002 |
| JP | 2004-124414 A | 4/2004 |
| KR | 10-2006-0082769 A | 7/2006 |

OTHER PUBLICATIONS

Office Action dated Sep. 1, 2017, by the State Intellectual Property Office of People's Republic of China in corresponding Chinese Patent Application No. 201510664790.8. (6 pages).

\* cited by examiner

Fig. 1

Prior Art

PIXEL ELECTRODE STRUCTURE AND LIQUID CRYSTAL DISPLAY PANEL

CROSS REFERENCE TO RELATED APPLICATIONS

The present application claims the priority of Chinese patent application CN201510664790.8, entitled "Pixel Electrode Structure and Liquid Crystal Display Panel" and filed on Oct. 15, 2015, the entirety of which is incorporated herein by reference.

FIELD OF THE INVENTION

The present disclosure relates to the technical field of liquid crystal display, and particularly to a pixel electrode structure and a liquid crystal display panel.

BACKGROUND OF THE INVENTION

With the development of Thin Film Transistor Liquid Crystal Display (TFT-LCD) and the progress of industrial technology, the manufacturing process of LCD is becoming increasingly mature, and the manufacturing cost thereof is becoming increasingly low. LCD has replaced cathode-ray tube display device and become a mainstream display device in this field.

High Vertical Alignment (HVA) liquid crystal display panel is one kind of Vertical Alignment (VA) liquid crystal display panel. In an HVA liquid crystal display panel, a liquid crystal layer with a certain pre-tilt angle is solidified on a surface of an alignment film through an optical alignment method, and thus traditional friction alignment technology can be omitted.

Figure 1:
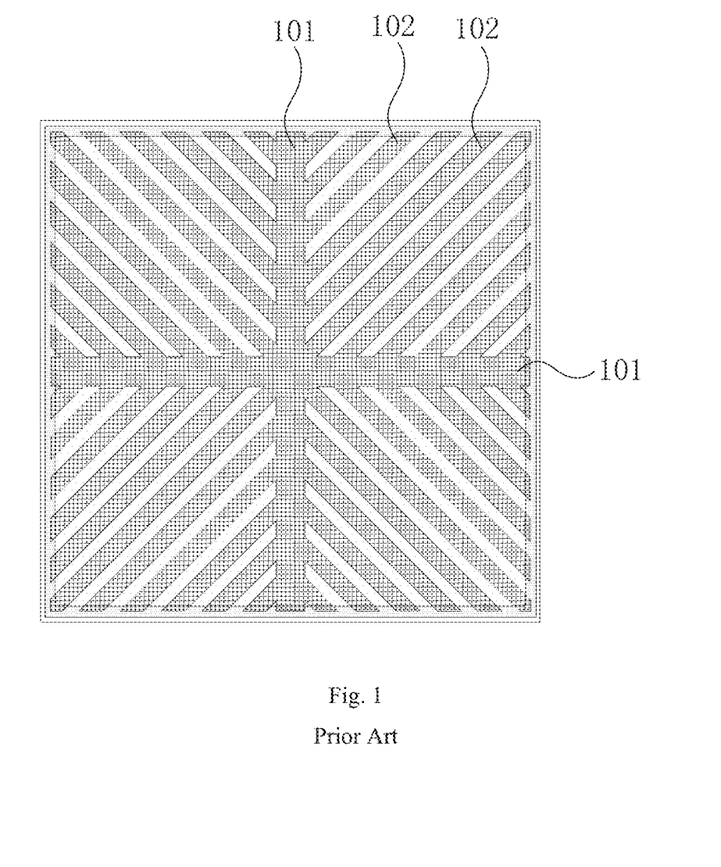
FIG. 1 schematically shows a structure of an HVA pixel electrode in the prior art.

FIG. 1 schematically shows a structure of a pixel electrode of an HVA liquid crystal display panel in the prior art. It can be seen from FIG. 1 that, at present, the tradition HVA pixel electrode mainly comprises four regions. Two trunk electrodes 101 intersect with each other and are perpendicular to each other so as to form four liquid crystal alignment regions. Each liquid crystal alignment region is provided with a plurality of branch electrodes 102 with an equal distance thereamong. The branch electrodes 102 have a same width, and each branch electrode 102 forms a 45° angle with a corresponding trunk electrode 101.

Since liquid crystal has different orientations when a panel is watched under different viewing angles, a color distortion would be resulted in when the panel is watched under a wide viewing angle. In order to solve the technical problem of color distortion when the panel is watched under a wide viewing angle, in the traditional HVA liquid crystal display panel, the pixel electrode is divided into eight regions (i.e., eight liquid crystal alignment regions), wherein part of them are main display regions, and the other part of them are sub display regions. In this liquid crystal display panel, the technical problem of color distortion when the panel is watched under a wide viewing angle can be solved through regulating the voltage of two kinds of display regions, and this display panel is generally call as a low color shift panel.

In a traditional low color shift display panel, the technical problem of color distortion when the panel is watched under a wide viewing angle can be solved. However, since in the liquid crystal display panel, the pixel electrode is divided into two kinds of display regions, an aperture ratio of the panel would be reduced inevitably. Moreover, in this kind of liquid crystal display panel, an effective electric potential of liquid crystal in a sub display region would be reduced. As a result, a brightness of the sub display region would decreases, and a light transmittance of the panel would be adversely affected.

SUMMARY OF THE INVENTION

The technical problem to be solved by the present disclosure is to eliminate the phenomenon of color distortion when a liquid crystal display panel is watched under a wide viewing angle and maintain an aperture ratio of the panel. In order to solve the aforesaid technical problem, the present disclosure provides a pixel electrode structure of a liquid crystal display panel, which comprises:

a first trunk electrode and a second trunk electrode, the first trunk electrode and the second trunk electrode intersecting with each other to form a plurality of liquid crystal alignment regions; and a plurality of branch electrodes, one end of each branch electrode being connected with at least one of the first trunk electrode and the second trunk electrode, and branch electrodes distributed in a same liquid crystal alignment region being parallel to one another, wherein in each of the liquid crystal alignment regions, distances between adjacent branch electrodes gradually decrease along a direction from a center of the liquid crystal alignment region to a corner thereof.

According to one embodiment of the present disclosure, a trunk-branch angle is formed by each branch electrode and a corresponding trunk electrode, and the trunk-branch angle ranges from 30° to 60°.

According to one embodiment of present disclosure, the trunk-branch angle is 45°.

According to one embodiment of the present disclosure, the first trunk electrode and/or the second trunk electrode is a bar-shaped electrode with a constant width at all positions thereof.

According to one embodiment of the present disclosure, the first trunk electrode and the second trunk electrode intersect with each other and are perpendicular to each other so as to form four liquid crystal alignment regions, and the branch electrodes in the four liquid crystal alignment regions are arranged symmetrical about the first trunk electrode and the second trunk electrode.

According to one embodiment of the present disclosure, the first trunk electrode and the second trunk electrode intersect with each other and are perpendicular to each other so as to form four liquid crystal alignment regions. Each liquid crystal alignment region is provided with one central branch electrode and a plurality of sub branch electrodes. The central branch electrode is connected with both the first trunk electrode and the second trunk electrode. In each of the liquid crystal alignment regions, distances between adjacent branch electrodes gradually decrease along a direction from the central branch electrode to far therefrom.

According to one embodiment of the present disclosure, in each liquid crystal alignment region, an occupancy space corresponding to a sub branch electrode is equal to an occupancy space corresponding to any other sub branch electrode. The occupancy space is a sum of a width of a sub branch electrode and a distance between the sub branch electrode and an adjacent branch electrode which is near to the central branch electrode.

According to one embodiment of the present disclosure, in each liquid crystal alignment region, the plurality of branch electrodes have a same width.

According to one embodiment of the present disclosure, the plurality of branch electrodes are arranged in a radial shape.

The present disclosure further provides a liquid crystal display panel, which comprises any one of the aforesaid pixel electrode structure.

In the pixel electrode structure according to the present disclosure, the branch electrodes are arranged with an unequal distance thereamong, which is different from the traditional pixel electrode structure with four liquid crystal alignment regions four domains) in which all branch electrodes are arranged with an equal distance thereamong. In this manner, an electric field distribution in the pixel electrode can be optimized, and an orientation of liquid crystal can be optimized accordingly. Therefore, a display performance of the liquid crystal display panel under wide viewing angle can be improved, and an aperture ratio thereof can be maintained.

Other features and advantages of the present disclosure will be further explained in the following description, and partially become self-evident therefrom, or be understood through the embodiments of the present disclosure. The objectives and advantages of the present disclosure will be achieved through the structure specifically pointed out in the description, claims, and the accompanying drawings.

BRIEF DESCRIPTION OF THE DRAWINGS

The drawings necessary for explaining the embodiments or the prior art are introduced briefly below to illustrate the technical solutions of the embodiments of the present disclosure or the prior art more clearly.

DETAILED DESCRIPTION OF THE EMBODIMENTS

The present disclosure will be explained in details with reference to the embodiments and the accompanying drawings, whereby it can be fully understood how to solve the technical problem by the technical means according to the present disclosure and achieve the technical effects thereof, and thus the technical solution according to the present disclosure can be implemented. It should be noted that, as long as there is no structural conflict, all the technical features mentioned in all the embodiments may be combined together in any manner, and the technical solutions obtained in this manner all fall within the scope of the present disclosure.

Many specific details are illustrated hereinafter for providing a thorough understanding of the embodiments of the present disclosure. However, it is obvious for those skilled in the art that, the present disclosure can be implemented in other methods in addition to the details or specifics described herein.

As shown in FIG. 1, in a traditional pixel electrode structure with four liquid crystal alignment regions, bar-shaped electrodes are arranged with an equal distance thereamong, and each branch electrode forms a 45° angle with a corresponding trunk electrode. In order to improve a display performance of a liquid crystal display panel under wide viewing angle and maintain an aperture ratio thereof, in a pixel electrode structure according to the present disclosure, branch electrodes in four liquid crystal alignment regions are arranged in a new manner. That is, the bar-shaped branch electrodes are arranged with unequal distances thereamong. In this manner, an electric field distribution in the pixel electrode can be optimized, and the orientation of the liquid crystal can be optimized accordingly. Therefore, a display performance of the liquid crystal display panel under wide viewing angle can be improved, and an aperture ratio thereof can be maintained.

The pixel electrode structure according to the present disclosure will be further illustrated hereinafter with reference to different embodiments to make the principle and technical effect thereof more clear.

Embodiment 1

Figure 2:
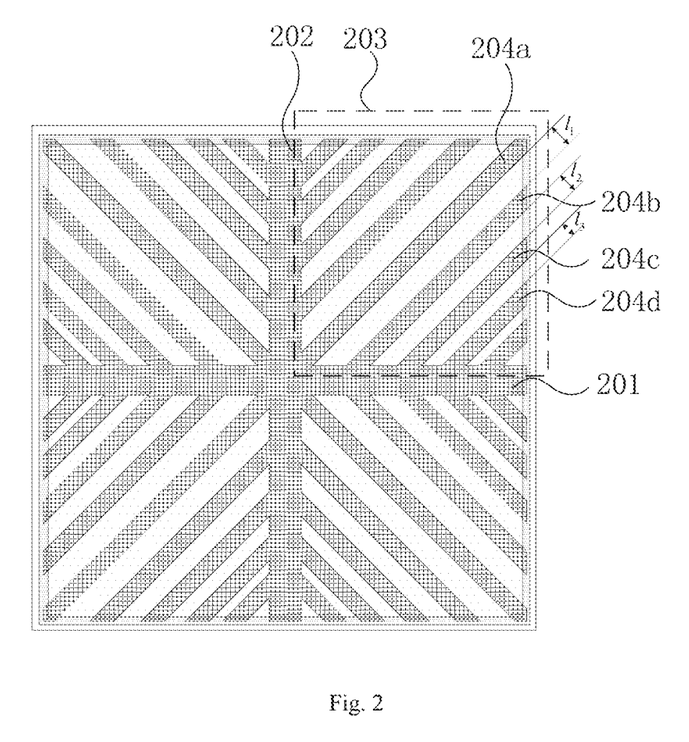
FIG. 2 schematically shows a structure of a pixel electrode according to one embodiment of the present disclosure.

FIG. 2 schematically shows a structure of a pixel electrode according to the present embodiment.

According to the present embodiment, the pixel electrode structure comprises a first trunk electrode 201, a second trunk electrode 202, and a plurality of branch electrodes. The first trunk electrode 201 and the second trunk electrode 202 intersect with each other and are perpendicular to each other. In this manner, in the pixel electrode structure, four liquid crystal alignment regions are defined according to different extending directions of the branch electrodes. The branch electrodes distributed in one liquid crystal alignment region are parallel to one another, and thus two adjacent branch electrodes have a same distance therebetween at each position thereof. An intersecting point of the first trunk electrode 201 and the second trunk electrode 202 is a trunk electrodes intersecting point.

According to the present embodiment, the branch electrodes in the four liquid crystal alignment regions are arranged symmetrical about the first trunk electrode 201 and the second trunk electrode 202. Therefore, in order to facilitate the description, the pixel electrode structure according to the present embodiment will be further illustrated hereinafter taking a first liquid crystal alignment region 203 as an example. In the pixel electrode structure according to the present embodiment, each branch electrode is a bar-shaped electrode with an equal width at each position thereof, and the plurality of branch electrodes have a same width.

As shown in FIG. 2, the first liquid crystal alignment region 203 is provided with a first branch electrode 204a, a second branch electrode 204b, a third branch electrode 204c, a fourth branch electrode 204d, and so on. One end of each branch electrode is connected with at least one of the first trunk electrode 201 and the second trunk electrode 202 and forms a trunk-branch angle with a corresponding trunk electrode.

The trunk-branch angle is an angle formed by a branch electrode along an extending direction from one end connected with a corresponding trunk electrode to the other end far therefrom and a corresponding trunk electrode along an extending direction from the trunk electrodes intersecting point to far therefrom. According to the present embodiment, the trunk-branch angle of each branch electrode is 45°. Of course, according to other embodiments of the present disclosure, the trunk-branch angle of each branch electrode can be other reasonable values (for example, a reasonable value in a range between 30° to 60°). The present disclosure is not limited by this.

The first branch electrode 204a is a central branch electrode of the first liquid crystal alignment region 203, and one end of the first branch electrode 204a is connected with both the first trunk electrode 201 and the second trunk electrode 202. That is, one end of the first branch electrode 204a is connected with the trunk electrodes intersecting point. Other branch electrodes in the first liquid crystal alignment region 203 are all sub branch electrodes.

In order to solve the technical problem of color shift of a liquid crystal display panel under wide viewing angle, in the pixel electrode structure according to the present embodiment, the branch electrodes are arranged with unequal distances thereamong. In the pixel electrode structure according to the present embodiment, in each of the liquid crystal alignment regions, distances between adjacent branch electrodes gradually decrease along a direction from a center of the liquid crystal alignment region to a corner thereof. Specifically, according to the present embodiment, in each of the liquid crystal alignment regions, a distance between two adjacent branch electrodes gradually decreases along a direction from the central branch electrode to far therefrom.

Specifically, as shown in FIG. 2, a distance $l_1$ between the first branch electrode 204a and the second branch electrode 204b is larger than a distance $l_2$ between the second branch electrode 204b and the third branch electrode 204c, and the distance $l_2$ between the second branch electrode 204b and the third branch electrode 204c is larger than a distance $l_3$ between the third branch electrode 204c and the fourth branch electrode 204d. Other branch electrodes are arranged in a same manner. That is, a distance between two adjacent branch electrodes gradually decreases along a direction from the central branch electrode to far therefrom.

It should be noted that, according to the present embodiment, each liquid crystal alignment region is provided with 9 branch electrodes, which is only used for facilitating the description thereof. According to other embodiments of the present disclosure, a quantity of the branch electrodes contained in each liquid crystal alignment region can be configured to be other reasonable values, and the present disclosure is not limited by this.

According to the present embodiment, when a voltage is applied on the pixel electrode structure, since in one liquid crystal alignment region, the branch electrodes are arranged with unequal distances thereamong, electric field with different strengths can be formed by the branch electrodes. Therefore, liquid crystal molecules can form different pre-tilt angles, and thus color shift of a display panel under wide viewing angle can be reduced and an aperture ratio thereof can be maintained.

Embodiment 2

Figure 3:
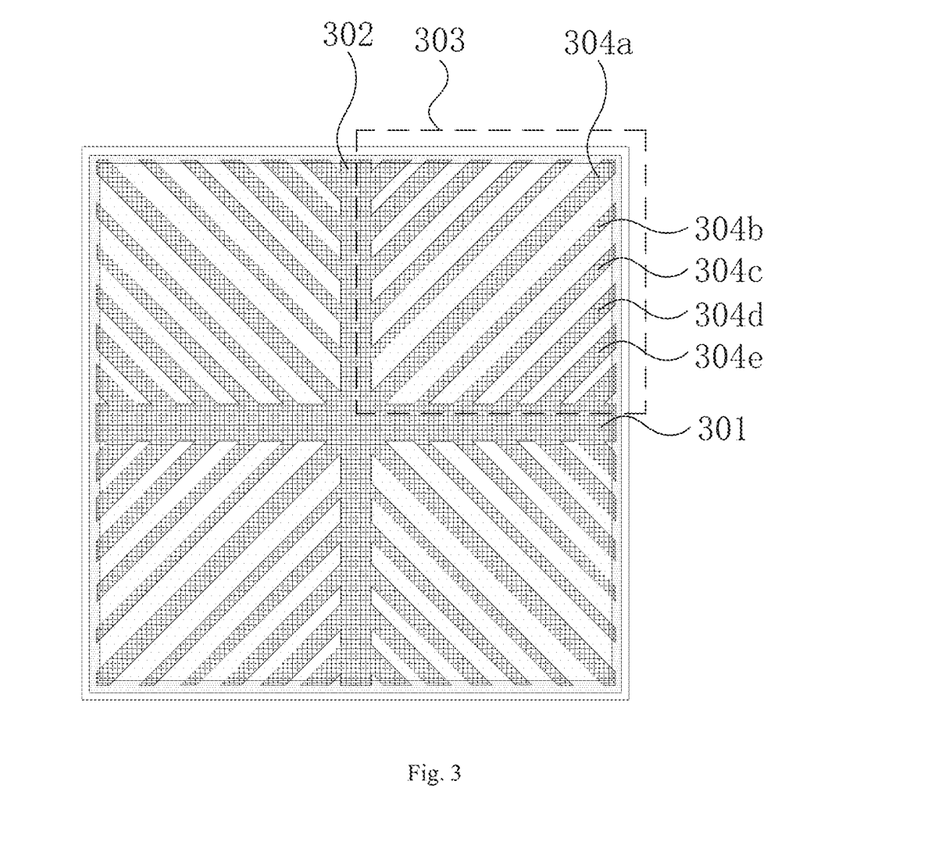
FIG. 3 schematically shows a structure of a pixel electrode according to another embodiment of the present disclosure.

FIG. 3 schematically shows a structure of a pixel electrode according to the present embodiment.

Similar to the pixel electrode structure as shown in FIG. 2, according to the present embodiment, the pixel electrode structure comprises a first trunk electrode 301, a second trunk electrode 302, and a plurality of branch electrodes. The first trunk electrode 301 and the second trunk electrode 302 intersect with each other and are perpendicular to each other so as to form four liquid crystal alignment regions. The branch electrodes distributed in one liquid crystal alignment region are parallel to one another. An intersecting point of the first trunk electrode 301 and the second trunk electrode 302 is a trunk electrodes intersecting point.

According to the present embodiment, the branch electrodes in the four liquid crystal alignment regions are arranged symmetrical about the first trunk electrode 301 and the second trunk electrode 302. Therefore, in order to facilitate the description, the pixel electrode structure according to the present embodiment will be further illustrated hereinafter taking a first liquid crystal alignment region 303 as shown in FIG. 4 as an example.

Figure 4:
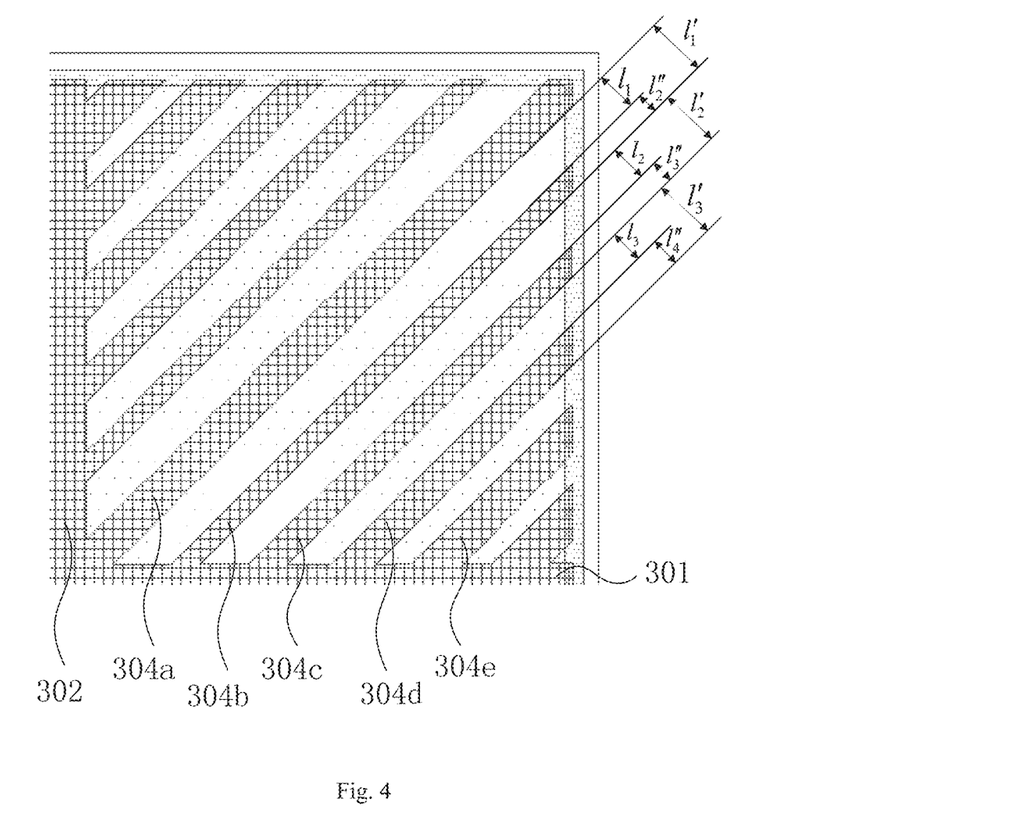
FIG. 4 schematically shows a structure of a first liquid crystal alignment region of the pixel electrode as shown in FIG. 3.

As shown in FIG. 4, the first liquid crystal alignment region 303 is provided with a first branch electrode 304a, a second branch electrode 304b, a third branch electrode 304c, a fourth branch electrode 304d, a fifth branch electrode 304e, and so on. One end of each branch electrode is connected with at least one of the first trunk electrode 301 and the second trunk electrode 302 and forms a trunk-branch angle with a corresponding trunk electrode. The trunk-branch angle is an angle formed by a branch electrode along an extending direction from one end connected with a corresponding trunk electrode to the other end far therefrom and a corresponding trunk electrode along an extending direction from the trunk electrodes intersecting point to far therefrom. It should be noted that, the first branch electrode 304a has two trunk-branch angles, i.e., an angle formed by the first branch electrode 304a and the first trunk electrode 301, and an angle formed by the first branch electrode 304a and the second trunk electrode 302. Among the two angles, one angle is a complementary angle of the other one.

The first branch electrode 304a is a central branch electrode of the first liquid crystal alignment region 303, and one end of the first branch electrode 304a is connected with both the first trunk electrode 301 and the second trunk electrode 302. That is, one end of the first branch electrode 304a is connected with the trunk electrodes intersecting point. According to the present embodiment, a trunk-branch angle $\theta_1$ formed by the first branch electrode 304a and the first trunk electrode 301 is preferably 45°. Since in the first liquid crystal alignment region 303, the branch electrodes are parallel with one another, a trunk-branch angle of each of other branch electrodes is also 45°.

Of course, according to other embodiments of the present disclosure, the trunk-branch angle of each branch electrode can be other reasonable values (for example, a reasonable value in a range between 30° to 60°). The present disclosure is not limited by this.

In order to solve the technical problem of color shift of a liquid crystal display panel under wide viewing angle, in the pixel electrode structure according to the present embodiment, the branch electrodes are also arranged with unequal distances thereamong. That is, in each of the liquid crystal alignment regions, a distance between two adjacent branch electrodes gradually decreases along a direction from a center of a liquid crystal alignment region to a corner thereof. Specifically, according to the present embodiment, in each of the liquid crystal alignment regions, a distance between two adjacent branch electrodes gradually decreases along a direction from the central branch electrode to far therefrom. The difference of the present Embodiment from Embodiment 1 lies in that, in the pixel electrode structure provided herein, the branch electrodes have unequal widths, while an occupancy space corresponding to a branch electrode is equal to an occupancy space corresponding to any other branch electrode.

According to the present embodiment, in each liquid crystal alignment region, an occupancy space corresponding to a branch electrode is a sum of a width of the branch electrode and a distance between the branch electrode and an adjacent branch electrode which is near to the central branch electrode.

For example, a first occupancy space $l'_1$ is a sum of a width $l''_2$ of the second branch electrode 304b and a distance $l_1$ between the second branch electrode 304b and the first branch electrode 304a, a second occupancy space $l'_2$ is a sum of a width $l''_3$ of the third branch electrode 304c and a distance $l_2$ between the third branch electrode 304c and the second branch electrode 304b, a third occupancy space $l'_3$ is a sum of a width $l''_4$ of the fourth branch electrode 304d and a distance $l_3$ between the fourth branch electrode 304d and the third branch electrode 304c, and so forth.

According to the present embodiment, although the width $l''_2$ of the second branch electrode 304b, the width $l''_3$ of the third branch electrode 304c, and the width $l''_4$ of the fourth branch electrode 304d are unequal to one another, the first occupancy space the second occupancy space $l'_2$, and the third occupancy space $l'_3$ are equal to one another.

As shown in FIG. 4, according to the present embodiment, a distance $l_1$ between the first branch electrode 304a and the second branch electrode 304b is larger than a distance $l_2$ between the second branch electrode 304b and the third branch electrode 304c, and the distance $l_2$ between the second branch electrode 304b and the third branch electrode 304c is larger than a distance $l_3$ between the third branch electrode 304c and the fourth branch electrode 304d. Other branch electrodes are arranged in a same manner. That is, a distance between two adjacent branch electrodes gradually decreases along a direction from the central branch electrode to far therefrom.

It should be noted that, according to the present embodiment, each liquid crystal alignment region is provided with 9 branch electrodes, which is only used for facilitating the description thereof. According to other embodiments of the present disclosure, a quantity of the branch electrodes contained in each liquid crystal alignment region can be configured to be other reasonable values, and the present disclosure is not limited by this. According to the present embodiment, when a voltage is applied on the pixel electrode structure, since in one liquid crystal alignment region, the branch electrodes are arranged with unequal distances thereamong, electric field with different strengths can be formed by the branch electrodes. Therefore, liquid crystal molecules can form different pre-tilt angles, and thus color shift of a display panel under wide viewing angle can be reduced.

Figure 5:
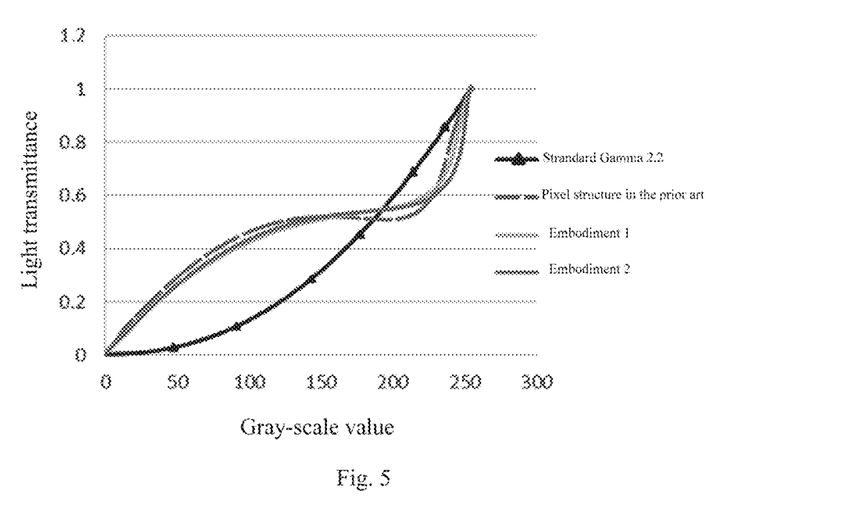
FIG. 5 schematically shows a comparative result of performance of a traditional HVA pixel electrode and pixel electrodes as shown in FIG. 2 and FIG. 3.

FIG. 5 schematically shows a comparative result of performance of a traditional pixel electrode and pixel electrode provided herein. It can be seen from FIG. 5 that, compared with the traditional pixel electrode, in the pixel electrode provided by Embodiment 1 and Embodiment 2 of the present disclosure, color shift of a liquid crystal display panel under wide viewing angle can be reduced.

The present disclosure further provides a liquid crystal display panel, which comprises the aforesaid pixel electrode structure.

It can be seen from the above description that, the branch electrodes are arranged with an unequal distance thereamong, which is different from the traditional pixel electrode structure with four liquid crystal alignment regions (i.e., four domains) in which all branch electrodes are arranged with an equal distance thereamong. In this manner, an electric field distribution in the pixel electrode can be optimized, and an orientation of liquid crystal can be optimized accordingly. Therefore, a display performance of the liquid crystal display panel under wide viewing angle can be improved, and an aperture ratio thereof can be maintained.

It could be understood that, the embodiments disclosed herein are not limited by the specific structures disclosed herein, but incorporate the equivalent substitutes of these features which are comprehensible to those skilled in the art. It could be also understood that, the terms used herein are used for describing the specific embodiments, not for limiting them.

The phrases "one embodiment" or "embodiments" referred to herein mean that the descriptions of specific features, structures and characteristics in combination with the embodiments are included in at least one embodiment of the present disclosure. Therefore, the phrases "one embodiment" or "embodiments" appeared in different parts of the whole description do not necessarily refer to the same embodiment.

For the purpose of convenience, a plurality of items and/or component units used herein can be listed in a common list. However, the list shall be understood in a way that each element thereof represents an only and unique member. Therefore, when there is no other explanation, none of members of the list can be understood as an actual equivalent of other members in the same list only based on the fact that they appear in the same list. In addition, the embodiments and examples of the present disclosure can be explained with reference to the substitutes of each of the components. It could be understood that, the embodiments, examples and substitutes herein shall not be interpreted as the equivalents of one another, but shall be considered as separate and independent representatives of the present disclosure.

The embodiments are described hereinabove to interpret the principles of the present disclosure in one application or a plurality of applications. However, a person skilled in the art, without departing from the principles and thoughts of the present disclosure, can make various modifications to the forms, usages and details of the embodiments of the present disclosure without any creative work. Therefore, the protection scope of the present disclosure shall be determined by the claims.

What is claimed is:

1. A pixel electrode structure of a liquid crystal display panel, comprising:
   a first trunk electrode and a second trunk electrode, the first trunk electrode and the second trunk electrode intersecting with each other to form a plurality of liquid crystal alignment regions; and
   a plurality of branch electrodes, one end of each branch electrode being connected with at least one of the first trunk electrode and the second trunk electrode, and branch electrodes distributed in a same liquid crystal alignment region being parallel to one another,
   wherein in each of the liquid crystal alignment regions, distances between adjacent branch electrodes gradually decrease along a direction away from a center of the liquid crystal alignment region;
   wherein in each liquid crystal alignment region, an occupancy space corresponding to a sub branch electrode is equal to an occupancy space corresponding to any other sub branch electrode; and wherein the occupancy space is a sum of a width of a sub branch electrode and a distance between the sub branch electrode and an adjacent branch electrode that is near to the central branch electrode.

2. The pixel electrode structure according to claim 1, wherein a trunk-branch angle is formed by each branch electrode and a corresponding trunk electrode, and the trunk-branch angle ranges from 30° to 60°.

3. The pixel electrode structure according to claim 2, wherein the trunk-branch angle is 45'.

4. The pixel electrode structure according to claim 1, wherein the first trunk electrode and/or the second trunk electrode is a bar-shaped electrode with a constant width at all positions thereof.

5. The pixel electrode structure according to claim 1, wherein the first trunk electrode and the second trunk electrode intersect with each other and are perpendicular to each other so as to form four liquid crystal alignment regions; and
  wherein the branch electrodes in the four liquid crystal alignment regions are arranged symmetrical about the first trunk electrode and the second trunk electrode.

6. The pixel electrode structure according to claim 1, wherein the first trunk electrode and the second trunk electrode intersect with each other and are perpendicular to each other so as to form four liquid crystal alignment regions;
  wherein each liquid crystal alignment region is provided with one central branch electrode and a plurality of sub branch electrodes;
  wherein the central branch electrode is connected with both the first trunk electrode and the second trunk electrode; and
  wherein in each of the liquid crystal alignment regions, distances between adjacent branch electrodes gradually decrease along a direction from the central branch electrode to far therefrom.

7. The pixel electrode structure according to claim 1, wherein in each liquid crystal alignment region, the plurality of branch electrodes have a same width.

8. The pixel electrode structure according to claim 6, wherein in each liquid crystal alignment region, the plurality of branch electrodes have a same width.

9. The pixel electrode structure according to claim 1, wherein the plurality of branch electrodes are arranged in a radial shape.

10. A liquid crystal display panel, comprising a pixel electrode structure, which comprises:
  a first trunk electrode and a second trunk electrode, the first trunk electrode and the second trunk electrode intersecting with each other to form a plurality of liquid crystal alignment regions; and
  a plurality of branch electrodes, one end of each branch electrode being connected with at least one of the first trunk electrode and the second trunk electrode, and branch electrodes that are distributed in a same liquid crystal alignment region being parallel to one another,
  wherein in each of the liquid crystal alignment regions, distances between adjacent branch electrodes gradually decrease along a direction away from a center of the liquid crystal alignment region;
  wherein in each liquid crystal alignment region, an occupancy space corresponding to a sub branch electrode is equal to an occupancy space corresponding to any other sub branch electrode; and
  wherein the occupancy space is a sum of a width of a sub branch electrode and a distance between the sub branch electrode and an adjacent branch electrode that is near to the central branch electrode.

11. The liquid crystal display panel according to claim 10, wherein a trunk-branch angle is formed by each branch electrode and a corresponding trunk electrode, and the trunk-branch angle ranges from 30° to 60°.

12. The liquid crystal display panel according to claim 11, wherein the trunk-branch angle is 45°.

13. The liquid crystal display panel, according to claim 10, wherein the first trunk electrode and/or the second trunk electrode is a bar-shaped electrode with a constant width at all positions thereof.

14. The liquid crystal display panel according to claim 10, wherein the first trunk electrode and the second trunk electrode intersect with each other and are perpendicular to each other so as to form four liquid crystal alignment regions; and
  wherein the branch electrodes in the four liquid crystal alignment regions are arranged symmetrical about the first trunk electrode and the second trunk electrode.

15. The liquid crystal display panel according to claim 10, wherein the first trunk electrode and the second trunk electrode intersect with each other and are perpendicular to each other so as to form four liquid crystal alignment regions;
  wherein each liquid crystal alignment region is provided with one central branch electrode and a plurality of sub branch electrodes;
  wherein the central branch electrode is connected with both the first trunk electrode and the second trunk electrode; and
  wherein in each of the liquid crystal alignment regions, distances between adjacent branch electrodes gradually decrease along a direction from the central branch electrode to far therefrom.

16. The liquid crystal display panel according to claim 10, wherein in each liquid crystal alignment region, the plurality of branch electrodes have a same width.

17. The liquid crystal display panel according to claim 15, wherein each liquid crystal alignment region, the plurality of branch electrodes have a same width.

18. The liquid crystal display panel according to claim 10, wherein the plurality of branch electrodes are arranged in a radial shape.

* * * * *